(12) United States Patent
Terek et al.

(10) Patent No.: US 9,104,534 B2
(45) Date of Patent: Aug. 11, 2015

(54) ABSTRACTING PROGRAMMATIC REPRESENTATION OF DATA STORAGE SYSTEMS

(71) Applicant: Microsoft Corporation, Redmond, WA (US)

(72) Inventors: Soner Terek, Bellevue, WA (US); Vladimir Sadovsky, Bellevue, WA (US); Surendra Verma, Bellevue, WA (US); Avi R. Geiger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 13/764,566

(22) Filed: Feb. 11, 2013

(65) Prior Publication Data

US 2013/0173872 A1    Jul. 4, 2013

Related U.S. Application Data

(63) Continuation of application No. 12/364,022, filed on Feb. 2, 2009, now Pat. No. 8,375,227.

(51) Int. Cl.
*G06F 12/00* (2006.01)
*G06F 3/06* (2006.01)

(52) U.S. Cl.
CPC ............ *G06F 12/00* (2013.01); *G06F 3/061* (2013.01); *G06F 3/064* (2013.01); *G06F 3/0608* (2013.01); *G06F 3/0626* (2013.01); *G06F 3/0671* (2013.01)

(58) Field of Classification Search
CPC ....... G06F 12/00; G06F 3/0608; G06F 3/061; G06F 3/064; G06F 3/0671

USPC .......... 711/103, 112, 114, 164, 173, E12.008, 711/E12.095; 365/218; 375/240.03; 707/758, 999.104

See application file for complete search history.

(56) References Cited

U.S. PATENT DOCUMENTS

| 5,257,362 A | 10/1993 | Menon |
| 5,459,853 A * | 10/1995 | Best et al. ................ 711/114 |
| 5,592,342 A | 1/1997 | Hall et al. |

(Continued)

OTHER PUBLICATIONS

Zachary Nathaniel Joseph Peterson, "Data Placement for Copy-on-Write Using Virtual Contiguity", University of California Santa Cruz, Thesis for Master of Science in Computer Science, Sep. 2002, pp. 1-58.*

(Continued)

*Primary Examiner* — Cheng-Yuan Tseng
*Assistant Examiner* — Kamal K Dewan
(74) *Attorney, Agent, or Firm* — Steve Wight; Judy Yee; Micky Minhas

(57) ABSTRACT

Providing for a paradigm shift in block-level abstraction for storage devices is described herein. At a block-level, storage is characterized as a variable size data record, rather than a fixed size sector. In some aspects, the variable size data record can comprise a variable binary key-data pair, for addressing and identifying a variable size block of data, and for dynamically specifying the size of such block in terms of data storage. By changing the key or data values, the location, identity or size of block-level storage can be modified. Data records can be passed to and from the storage device to facilitate operational commands over ranges of such records. Block-level data compression, space management and transactional operations are provided, mitigating a need of higher level systems to characterize underlying data storage for implementation of such operations.

20 Claims, 10 Drawing Sheets

(56) References Cited

U.S. PATENT DOCUMENTS

| | | | |
|---|---|---|---|
| 5,664,144 | A | 9/1997 | Yanai et al. |
| 5,781,921 | A | 7/1998 | Nichols |
| 6,370,645 | B1 | 4/2002 | Lee |
| 6,829,672 | B1 | 12/2004 | Deng et al. |
| 7,076,544 | B2 | 7/2006 | Katz et al. |
| 7,095,853 | B2 | 8/2006 | Morishita |
| 7,159,105 | B2 | 1/2007 | Rothman et al. |
| 7,249,227 | B1* | 7/2007 | Pittman ............ 711/154 |
| 7,380,120 | B1* | 5/2008 | Garcia ............ 713/160 |
| 2003/0195898 | A1* | 10/2003 | Agarwal et al. .......... 707/103 R |
| 2005/0160217 | A1 | 7/2005 | Gonzalez et al. |
| 2006/0075284 | A1 | 4/2006 | Skan |
| 2006/0161767 | A1 | 7/2006 | Wang et al. |
| 2006/0212698 | A1* | 9/2006 | Peckover ............ 713/151 |
| 2006/0224821 | A1 | 10/2006 | Chen et al. |
| 2007/0050762 | A1 | 3/2007 | Chen et al. |
| 2007/0143530 | A1 | 6/2007 | Rudelic et al. |
| 2007/0156634 | A1* | 7/2007 | Martin ............ 707/1 |
| 2008/0022120 | A1 | 1/2008 | Factor et al. |
| 2010/0199109 | A1 | 8/2010 | Terek et al. |
| 2011/0246550 | A1 | 10/2011 | Levari et al. |
| 2011/0302375 | A1 | 12/2011 | Elko et al. |
| 2012/0221803 | A1 | 8/2012 | Stabrawa et al. |

OTHER PUBLICATIONS

Loh, "WRT54GL History", Mar. 6, 2006 <<http://www.extremetech.com/article2/0,1697,1934591,00.asp>> Last accesssed Oct. 25, 2007, 3 pages.

Non-Final Office Action for U.S. Appl. No. 12/364,022, mailed on Oct. 7, 2011, Soner Terek, "Abstracting Programmatic Representation of Data Storage Systems", 28 pages.

Office Action for U.S. Appl. No. 12/364,022, mailed on Mar. 22, 2012, Soner Terek, "Abstracting Programmatic Representation of Data Storage Systems", 32 pgs.

Samsung to Mass Produce 16Gb NAND Flash, Apr. 30, 2007. <<http://www.cdrinfo.com/Sections/News/Details.aspx?NewsId=20324>> Last accessed Oct. 25, 2007, 1 page.

SST Announces SPI Serial Flash Memory Support for Intel's Q965 PRO Chipsets, Aug. 31, 2006. <<http://www.sst.com/news/?id=333>> Last accessed Oct. 25, 2007, 2 pages.

* cited by examiner

ABSTRACTING PROGRAMMATIC REPRESENTATION OF DATA STORAGE SYSTEMS

RELATED APPLICATIONS

This application is a continuation of U.S. patent application Ser. No. 12/364,022, filed Feb. 2, 2009, which issued as U.S. Pat. No. 8,375,227 on Feb. 12, 2013, and which is hereby incorporated herein by reference in its entirety.

BACKGROUND

Data storage technology is an integral part of modern electronic computing and electronic communication. One of the great stimuli for advancement in electronic computing, personal electronics, and electronic communication has been rapid advancements in storage technology. For instance, Moore's law predicts, with fair accuracy, that the number of transistors that can be placed onto an integrated circuit will double approximately every two years. Corollaries to Moore's law suggest that similar increases result in processing power, pixel size in digital displays (e.g., liquid crystal displays), and capacity for data storage devices. For many years, those predictions have been relatively correct.

As storage capacity increases, so can the complexity of applications implemented on an electronic device. For instance, increased storage capacity results in smaller devices, typically running at cooler temperatures. When coupled with increased processing power, additional performance and complexity can be implemented in a smaller package. Accordingly, small hand-sized devices having the capacity and usefulness of desktop computers just a few years old are available.

Although data storage capacity has increased significantly, the fundamental implementation of logical interface (or abstraction) to such devices has remained relatively constant. For instance, whether a tape drive, hard disk, compact disc, random access memory, or the like, physical storage area of such devices is typically characterized by blocks of fixed size memory, addressed by location. Thus, data storage or memory is often characterized as building blocks of fixed size segments of physical storage media. A small set of data can be saved to one or a few such blocks, whereas larger sets of data are saved to larger numbers of blocks. Furthermore, an addressing scheme is employed to link blocks storing related data, in order to facilitate recollection of such data.

Although typical block-level addressing schemes (e.g., employing a tag and location to identify and find particular blocks of storage) are usually not intuitive or useful for device users, due to the vast numbers of storage blocks, such schemes can be useful for interface by host electronic systems. Systems can further abstract a block-level data characterization into a 'higher' level characterization helpful to users. For instance, an operating system might characterize storage as a hierarchy of files comprising subsets of a superset of data storage. As another example, a database might characterize storage as a data table, spreadsheet, or the like. Such systems have proven useful for users to understand and manipulate data storage. As the number of types of electronic devices (e.g., desktops, laptops, mobile phones, personal digital assistants, gaming systems, etc.) and the operating systems and applications become more diverse, the quantization or atomicity of block-level storage has proved a powerful tool.

In addition to the foregoing, memory and processing resources of electronic devices have generally followed Moore's Law. To paraphrase Moore's Law, the number of transistors on a chip (impacting both storage space and processing efficiency) will approximately double every two years. New mass storage devices, such as hard drives, FLASH chips, random access memory (RAM), and the like, therefore have gained significant storage space per volume over the previous several years. Moreover, data processing and memory interface speeds have improved as well, both for external and on-board processing, yielding increased efficiency for such devices. Accordingly, higher level abstractions of storage (e.g., databases) can significantly enhance operation of a host system coupled with a storage device, and further improvements in storage and processing efficiency are anticipated to further those enhancements.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure provides a paradigm shift in block-level abstraction for storage devices. At a block-level, storage is characterized as a variable size data record, or a simple record, rather than a fixed size sector. In some aspects, the variable size data record can comprise a key-data pair, for addressing and identifying a variable size block of data, and for specifying the size of such block in terms of data storage. By changing the key or data values, the location, identity or size of a record stored in block-level storage can be modified. Such an abstraction enables efficient data operations while providing increased power for higher layer abstractions of data.

According to some aspects of the subject disclosure, simple records can be clustered on a storage device as a function of key values to improve response time and read/write latency. Additionally, compression of adjacent keys is provided for efficient key storage. According to still other aspects, insertion, update and delete functionality is provided, at a block-level, in addition to read capability. Enabling insert and delete functionality for simple records, in addition to read and update operations, moves space management operations below the new block-layer of abstraction, significantly reducing complexity at higher levels (e.g., at a file system or database level). Furthermore, transactional operations such as error correction, error detection, de-fragmentation, data rollback, and so on, can be implemented at the block-level, further improving efficiency for these higher level systems. Accordingly, the subject disclosure provides, in some aspects, reduction of design concerns involving physical layer characteristics to a block-layer of abstraction, enabling higher layers to focus on usage patterns and key formation decisions in constructing higher level abstracted data objects.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
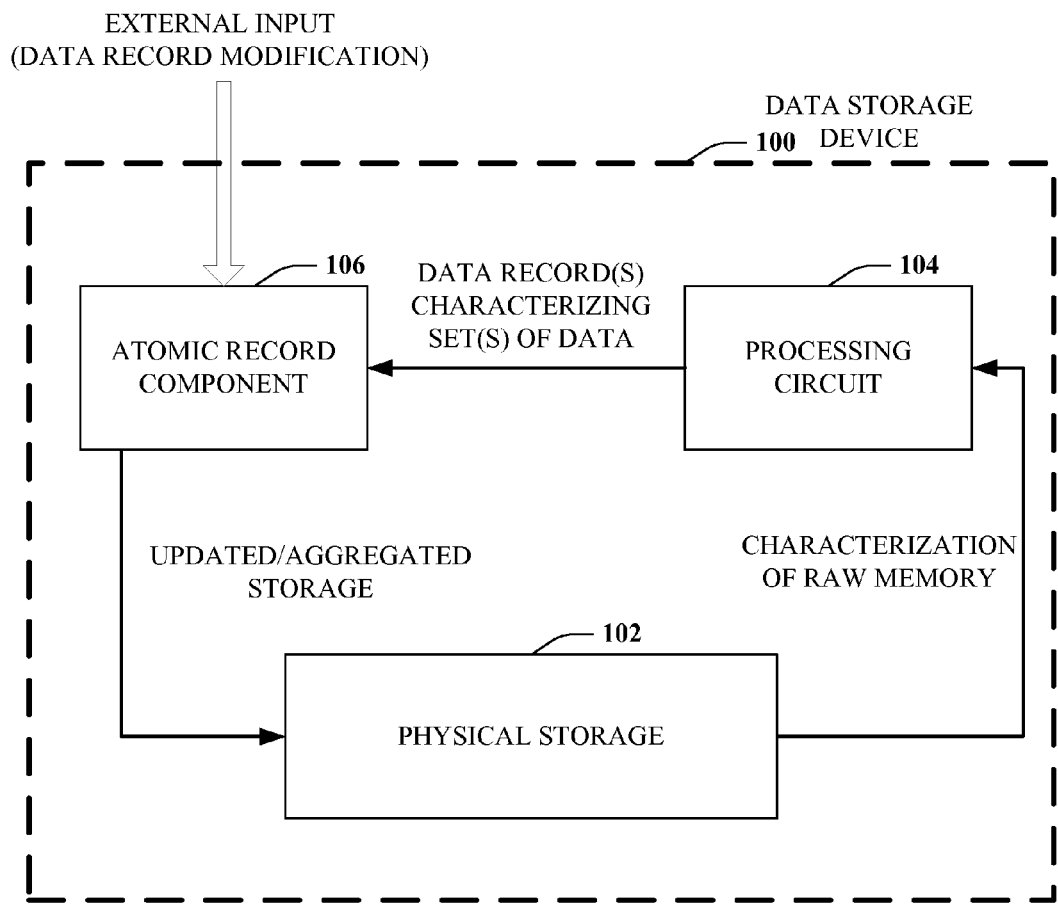
FIG. 1 depicts a block diagram of an example storage device that provides characterizes block-level data as variable size record objects according to some aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this disclosure, the terms "component," "module," "system", "interface", "engine", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component can be localized on one computer and/or distributed between two or more computers. As another example, an interface can include I/O components as well as associated processor, application, and/or API components, and can be as simple as a command line or a more complex Integrated Development Environment (IDE).

In typical storage devices, the common layer of abstraction is block storage organized as a collection of homogenous, fixed size sectors. The sectors can be written to or read from as ranges based on sector numbers, where sector numbers are always assigned in a sequential non interrupted order. Although the simplicity of the abstraction creates a low bar for interfacing to such a storage device, higher level data structures (e.g., a file system) are left with implementing several configurations required to make the low level abstraction useful. For instance, tracking which sectors are free and which are in use is typically left to the higher level structures. Furthermore, forming a layout of objects or entities over the sectors for efficient retrieval and updating of data is also typically left to higher level structures.

For modern electronic devices, various factors influence an efficient design of a logical interface to a storage system (including, e.g., an abstraction of underlying storage, a storage sub-system, and so on). One factor includes the physical characteristics of such device. For instance, storage device performance or utility is often related to latency/bandwidth ratio, reliability in completing update operations of a given data size, smallest size of a workable block of data (e.g., 512 byte block), performance of random or sequential block access or ratios thereof, and so forth. Another factor could include usage patterns of data objects constructed from data stored in a physical storage device (e.g., file objects, table objects, record objects).

One problem for design of efficient higher level storage is the vast increase in different data usage patterns in conjunction with increasing physical variations of available storage devices. Thus, designs that accommodate many or all such usage patterns for a large number of storage devices can become exceedingly complex and time consuming. One issue here is that the basic block-level data abstraction of most storage devices, comprising numbered fixed size sectors, does not provide an optimal match between physical characteristics of such devices and data usage patterns at higher layers of abstraction. What is needed is a new layer of low-level abstraction that can have distinct implementations based on physical characteristics of a storage device while enabling most high-level usage patterns.

To address the foregoing concerns, the subject disclosure provides a new abstraction layer for storage devices that can be common across various storage applications, from the simples of file systems to the most complex transactional databases. According to some aspects of the subject disclosure, provided is a storage device having a variable size data record representing a fundamental block-level unit of storage abstraction. According to particular aspects, the variable size data record can comprise a variable size key-data pair, also referred to as a simple record. According to at least one aspect, the key and data parts of the variable size key-data pair can comprise variable length binary fields.

This new block-level unit of abstraction can comprise one or more of several characteristics. Specifically, records can be clustered by key values (e.g., based on a binary comparison). Additionally, efficient storage of keys on or internally to the storage device can be provided. An example of such storage can include prefix compression of adjacent keys. Because records can be clustered as a function of key value, such compression can be relatively simple to implement. In addition to the foregoing, insertion, update and deletion of records can be supported in addition to reading records. Thus, many space management problems can be moved below the new layer of abstraction, and handled by the storage devices instead of by higher level systems (e.g., operating systems, database applications). In this case processing element (CPU) embedded in the storage device will run algorithms mapping between levels of abstraction and efficiently utilizing physical characteristics and resources inside the perimeter or a storage device.

In addition to the foregoing, providing variable length binary keys enables efficient formation of higher level data objects through clustering of simple records at the block storage level (e.g., semantic clustering of key values). In addition to simplifying object formation at higher levels of abstraction, representing block-level storage by variable length binary keys moves the problem of physically clustering records (e.g., keys) below the block-level layer of abstraction. Accordingly, higher level layers can focus on usage patterns, generating consecutive key values for data records deemed likely to be accessed together, and so on. Just as significant, higher level layers can often avoid space management, data transactioning, and other fundamental data maintenance operations in many circumstances. As described, the subject disclosure provides a significant paradigm shift in characterizing data storage, enabling greater efficiency and effectiveness at higher levels of software design. In the same time powerful processors of storage subsystems or devices are able to be more effective in managing higher level abstractions.

It should be appreciated that, as described herein, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and FLASH memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). The aforementioned carrier wave, in conjunction with transmission or reception hardware and/or software, can also provide control of a computer to implement the disclosed subject matter. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the amended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the figures, FIG. 1 depicts a block diagram of an example data storage device 100 that provides efficient block-layer data abstraction according to aspects of the subject disclosure. Storage device 100 can comprise various suitable devices for storing analogue or digital information. Examples can include non-volatile memory such as a hard drive, a tape drive, a cassette drive, a CD drive, a DVD drive, FLASH memory, and so on. Additionally, storage device 100 can include volatile memory such as random access memory (RAM), dynamic RAM (DRAM), cache memory, or the like. Furthermore, storage device 100 can provide a powerful mechanism for manipulating and representing data based on the efficient block-layer data abstraction described herein.

Storage device 100 comprises a physical storage media 102. In some aspects, physical storage media 102 can comprise a single data storage medium (e.g., a CD, DVD, magnetic tape, etc.) or multiple distinct sets of the storage medium (e.g., one or more memory chips comprising one or more data storage blocks of fixed storage size, such as 256 bytes, 512 bytes, or other suitable size unit of data). In at least some aspects, the physical storage media 102 can comprise combinations of different types of storage media, such as RAM and FLASH memory chips, or other suitable combinations of storage media.

The physical storage media 102 can be characterized by a processing circuit 104 that is coupled (e.g., electronically, magnetically) to the storage media 102. Such characterization can involve mapping a subset of the physical memory 102 to a variable data record. The data record can represent the subset of physical storage (102), and can further be utilized to distinguish the subset from other subsets of storage, define size of the subset in units of storable data, identify a relative or absolute location of the subset within the physical storage media 102, or the like.

In some aspects of the subject disclosure, the variable data record can comprise a variable size key-data pair. Additionally, the key-data pair can be formed from a variable length key portion and a variable length data portion. The key portion can be utilized to identify the data record, define or determine a location of the record relative the physical storage 102, as well as correlate like data records. For instance, key portions that have similar values can be correlated, based on a degree of similarity. In at least some aspects of the subject disclosure, the variable length key portion can comprise a variable length binary field. Such a field provides a great degree of labeling flexibility, as binary digits are not limited to numeric integers, but can represent many abstractions of data, including numbers or letters of various alphabets, type characters (e.g., ampersand, dollar sign, percentage character, pound sign, and so on), colors, and so forth.

A variable length data portion of the key-data pair can be utilized to quantify an amount of data associated with a data record. Because the data portion is variable, the quantified amount of data can also change. Thus, for instance, a size of a particular data record in terms of storable data can be dynamically modified by changing a value of the variable size data portion. In some aspects, the data portion can be a variable length binary field, enabling diverse characterization of a quantity or quantities of data associated with the data record.

Data records mapped to physical storage 102 can be accessed by an atomic record component 106. The atomic record component 106 can output the data records to external devices, providing an external characterization of data stored in the physical storage 102. Additionally, the atomic record component 106 can receive data records from external sources. Furthermore, the atomic record component 106 can dynamically update a mapping of data records to physical storage 102 based on changes to values of the data records. For instance, updated key or data fields can be utilized to rearrange location of stored data, correlate subsets of stored data (e.g., based on similarities in key values of respective subsets), and the like. As will be described in further detail, infra, the atomic record component 106 can also perform various data operations and commands based on data record values, or command functions.

Data operations implemented by the atomic record component 106 can be based on specified keys or ranges of keys. Such an implementation can provide atomicity of subsets of physical storage 102. In addition, atomic record component 106 can control durability of stored data as an operation over a range of key values. It should be appreciated that durability operations can be implemented before or after other such operations, providing flexible control of data volatility.

Operations can comprise read operations, write operations, delete operations, insert operations, or make-durable operations, although such a list of operations is not exhaustive. Rather, other operations known in the art can also be implemented by atomic record component 106, in addition to or in the alternative to the foregoing.

In some aspects, a Read command can be implemented as a function of data record range, and optionally as a function of additional flag commands. The read command can receive the range and flag commands as inputs, and output a record stream. An example of a suitable Read command can be:

Read Range, Flags-><Record Stream>.

The atomic record component 106 can return a set of data associated with records in the specified range (e.g., in binary key order specified by the range) in response to the Read command, subject to optional flag commands. Such commands can include a No Data flag, indicating that the atomic record component 106 should omit returning data in the <Record Stream>. In this case, the record stream contains only key values associated with the specified range of keys. Other optional flags for the Read command can include a Data Length flag or a Sampling flag. In response to the Data Length flag, atomic record component 106 can return length of specified data in place of the data itself in the <Record Stream>. Such a flag implies the No Data flag. In response to the Sampling flag, atomic record component 106 only returns sample records from the specified range. Variations of sampling can enable return of a fixed record count rate (e.g., one record for approximately every 'x' records), a fixed data rate (e.g., one record for approximately every 'x' bytes of storage), or a fixed count of samples (e.g., 'x' samples for an entire range taken with the fixed data rate approach).

The atomic record component 106 can respond to a Write command by writing records in an input <Record Stream> to the physical storage 102. The command can be utilized for creation of new records as well as replacing or modifying existing records. For instance, where atomic record component 106 obtains a key value that is identical to a current key value, the key can be replaced or modified based on the new key value. An example format for a write command can be:

Write Range, Flags, <Record Stream>-><Result Stream>

Atomic record component 106 can optionally return a <Result Stream> that includes Key-ResultCode pairs for some, all or none of the records controlled by command options provided in the optional write flags.

It should be appreciated that new records can become visible to other concurrent commands during execution of a Write command. Furthermore, new records will typically become visible when a Write command is completed. To provide atomicity of data records, replacement of a record with a new value can be implemented as an atomic operation. For instance, an old record and a new record can be restricted from being visible to other commands concurrently.

Suitable optional flags for the Write command can include Make Durable, Unsorted Stream, No New Record, Replace Range, No Existing Record, Terminate on Error, Failures in Result, Replace Records in Result, Replace Record Keys in Result, New Record Keys in Result, or Stream Size, or a combination thereof. The Make Durable flag can specify that effects of the write command can be made durable after execution of the command. Such a flag can mimic results of a Make Durable command received after a Write command.

Unsorted Stream flag can specify that an input <Record Stream> is not sorted by key values. The No New Record flag can specify that all records in the <Record Stream> must already exist in physical storage 102. A new record is not to be created in implementing the Write command; instead, an error condition is created for the new record. The No New Record flag can be mutually exclusive with the No Existing Record flag, but can be utilized in conjunction with the Unsorted Stream flag.

Replace Range flag can specify that the input stream will replace records specific within a range. The Replace Range flag can be utilized to remove records by specifying an empty <Record Stream>. In response to a No Existing Record flag, atomic record component 106 should perform a complete replace if existing records having key values identical to those specified in the key range exist within the physical storage 102. This flag can be mutually exclusive with the No New Record or Unsorted Stream flags.

A Terminate on Error flag can specify whether the atomic record component 106 should terminate early when an error is encountered. If such is the case, the <Result Stream> can contain a single result, comprising the first record resulting in an error. In contrast, the Failures in Result flag can specify that all records resulting in an error should be included in the <Result Stream>.

The Replace Records in Result flag can specify that all records replaced by new records should be included in the <Result Stream>. Furthermore, the Replaced Record Keys in Result flag can specify that keys for all records replaced by new records should be included in the <Result Stream>. In addition, the New Record Keys in Result flag can specify that all keys of records inserted as new records should be included in the <Result Stream>. Additionally, the Stream Size flag can specify that a number of records, average size of keys or average size of data can be returned in the <Result Stream>.

A Make Durable command can have the following form:
MakeDurable Range->void

Such command can specify that data written to a range of records is to be made durable upon completion of the write. In this context, a completed Write command refers to finalized Write commands prior to execution of the Make Durable command. It should be appreciated, however, that where atomic record component 106 is free to make operations durable at various suitable times, the order of durability is not guaranteed.

Figure 2:
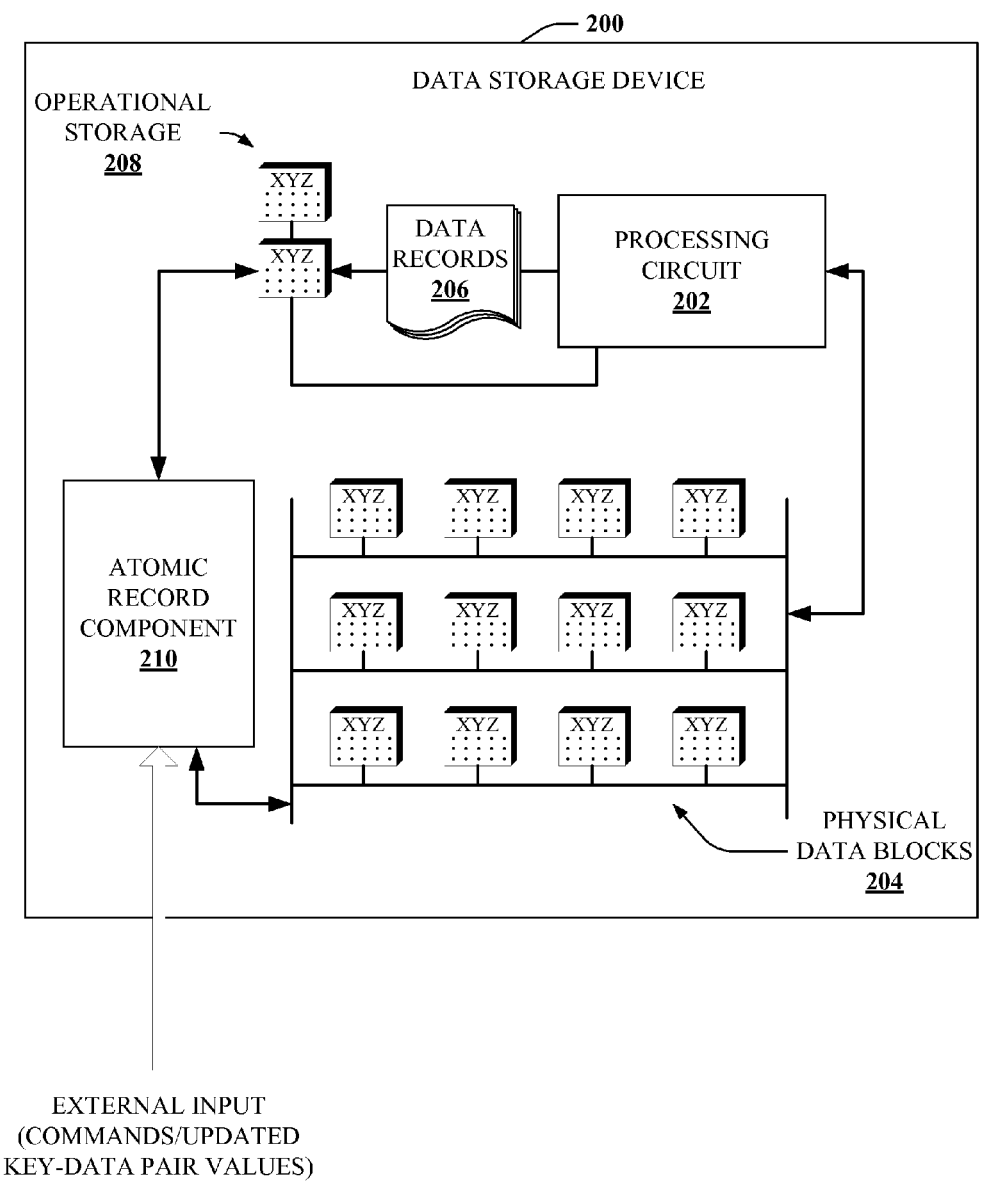
FIG. 2 depicts a block diagram of a sample storage device that dynamically restructures stored data based on external input of record object values.

FIG. 2 illustrates a block diagram of an example data storage device 200 according to further aspects of the subject disclosure. Data storage device 200 can comprise non-volatile or volatile memory having discrete sets of physical data blocks 204. An example of data storage device 200 can comprise a FLASH storage device, RAM module, or the like.

Figure 5:
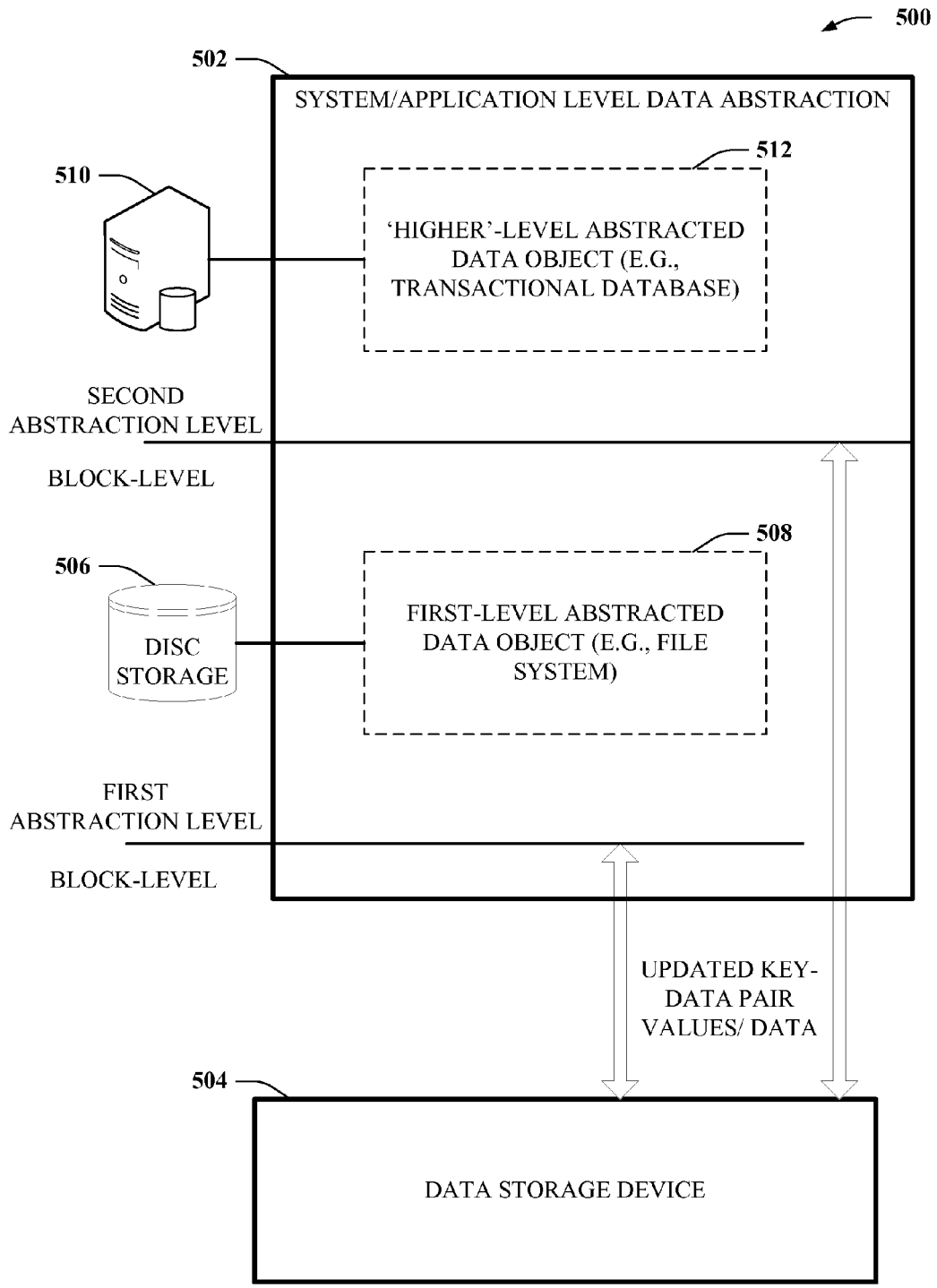
FIG. 5 illustrates a block diagram of high level data abstraction employing manipulation of variable key-data pair records according to other aspects.

Data storage device 200 comprises a processing circuit 202 for generating a flexible characterization of physical data blocks 204 that can be utilized to build higher level data objects (e.g., see FIG. 5, infra). The characterization can comprise a mapping of identity, number and location of a subset of the data blocks 204 to one or more data records 206. In some aspects, a data record 206 can comprise a pair of variable length binary fields arranged as a key-data pair, as described herein. Key values can identify data blocks mapped to the data record 206, as well as specify locations of such blocks (e.g., based on a location addressing mechanism). Data values can identify a size of data storage (e.g., in bits, bytes, or the like) associated with the data record 206. By modifying the key and data values, dynamic mapping of data blocks 204 to the data record 206 can be accomplished. In some aspects, such dynamic mapping can be implemented by an atomic record component 120.

Data records can be stored by the processing circuit 202 or atomic record component in a set of operational storage blocks 208. In some aspects of the subject disclosure, the operational storage blocks 208 can be reserved for storage of key-data pairs, whereas respective data associated with the key-data pairs are stored in physical data blocks 204. According to one or more additional aspects, a number of operational storage blocks 208 can be variable. For instance, physical data blocks 204 can be dynamically allocated as operational storage 208 or as physical data blocks 204 by processing circuit 202.

Data storage device 200 can further comprise an atomic record component 210 for implementing external commands, restructuring data records 206 or data stored in physical data blocks based on such commands, returning data record values or statistical information of such values (e.g., number of errors, length of data, read times, write times, and so on) in response to commands, or outputting data in response to commands, or a combination thereof. In addition, atomic record component 210 can output current key-data pair values as well as facilitate updating key-data pair values of data records 206 in response to external input. Accordingly, data storage device 200 is capable of providing storage information to external devices based on a data abstraction comprising flexible data records, rather than a fixed size/number characterization of blocks of data.

Based on variable data record characterization, atomic record component 210 can implement space management operations, data transactioning operations, and other data management at the block-level of abstraction. Such an implementation can greatly simplify code design for external systems and applications. Specifically, such systems/applications can construct complex data objects simply by managing data record values mapped to the underlying data stored in physical data blocks 204. Accordingly, a significant amount of overhead design involved in space management, error detection, error correction, de-fragmentation, and the like, can be obviated at the system or application level. Furthermore, data storage device 200 can implement more advanced data processing behind the block-level of abstraction, such as data compression, encryption/decryption, latency optimization, and so on, further reducing system and application level overhead. Such an arrangement is a significant paradigm shift in data storage characterization, potentially providing great advantage in various levels of computer software design.

Figure 3:
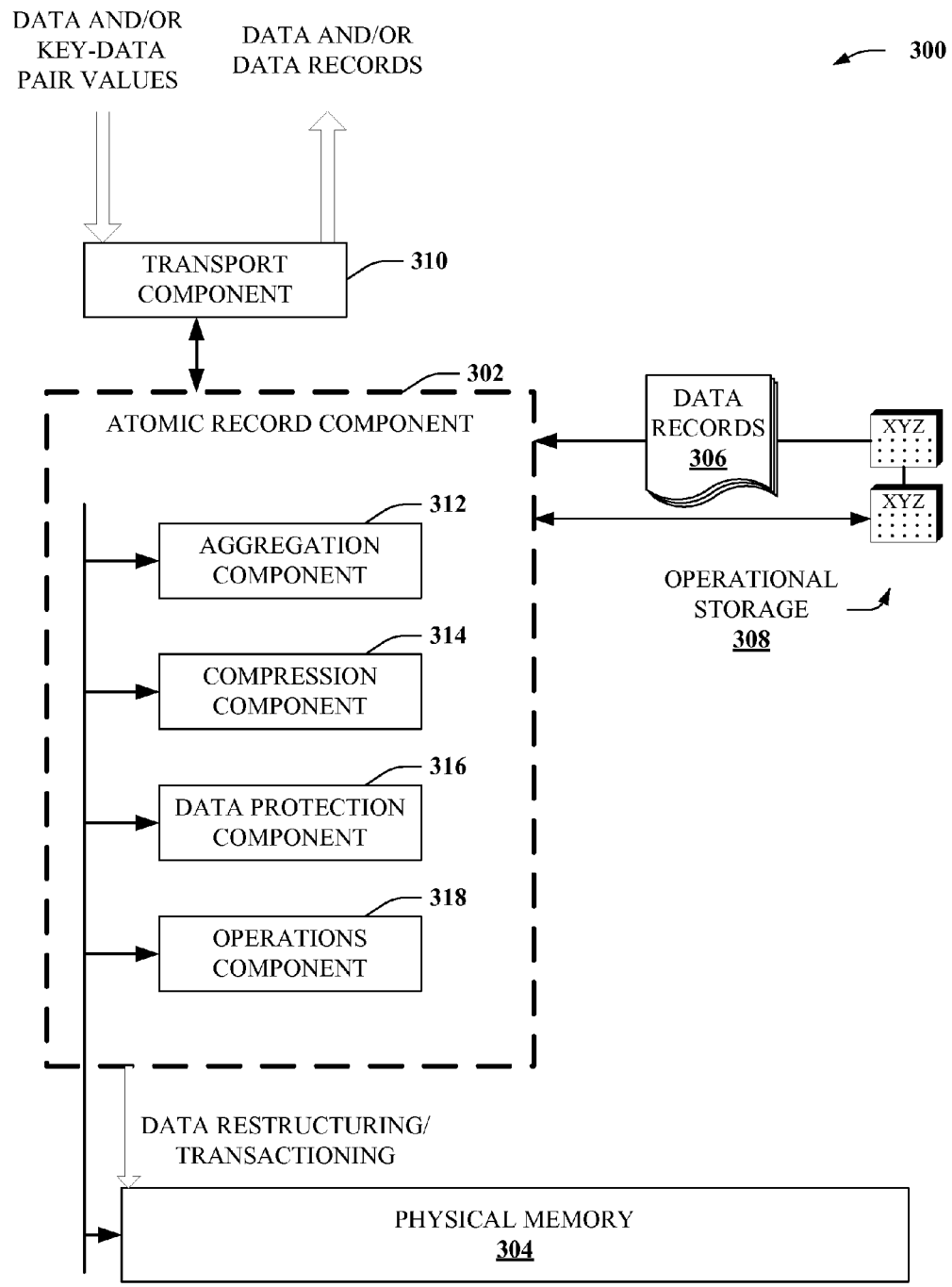
FIG. 3 illustrates a block diagram of an example storage device providing block-level transactioning operations for data storage according to additional aspects.

FIG. 3 depicts a block diagram of an example data storage system 300 according to additional aspects of the subject disclosure. Data storage system 300 can implement a block-level abstraction for physical data storage that provides flexibility and reduced overhead for higher level characterization of stored data. Specifically, system 300 involves a significant paradigm shift in abstracting data storage, simplifying design considerations for a wide variety of data usage implementations and for disparate types of storage media.

System 300 can comprise an atomic record component 302 for managing data stored in physical memory 304. Such data can be mapped to flexible data records 306 comprising variable binary key-data pairs. The data records 306 can be stored in operational memory 308, which can be physically separate from physical memory 304, or logically separated, by character flags provided by atomic record component 302.

As described herein, the variable binary key-data pairs of the data records 306 can comprise binary data fields for identifying, locating and sizing subsets of physical memory 304 associated with the records 306. Thus, data stored in physical memory 304 can be tracked via the data records 306. Furthermore, allocation of subsets of physical memory to various data records 306 can be controlled by adjustment of key-data pair values.

Figure 4:
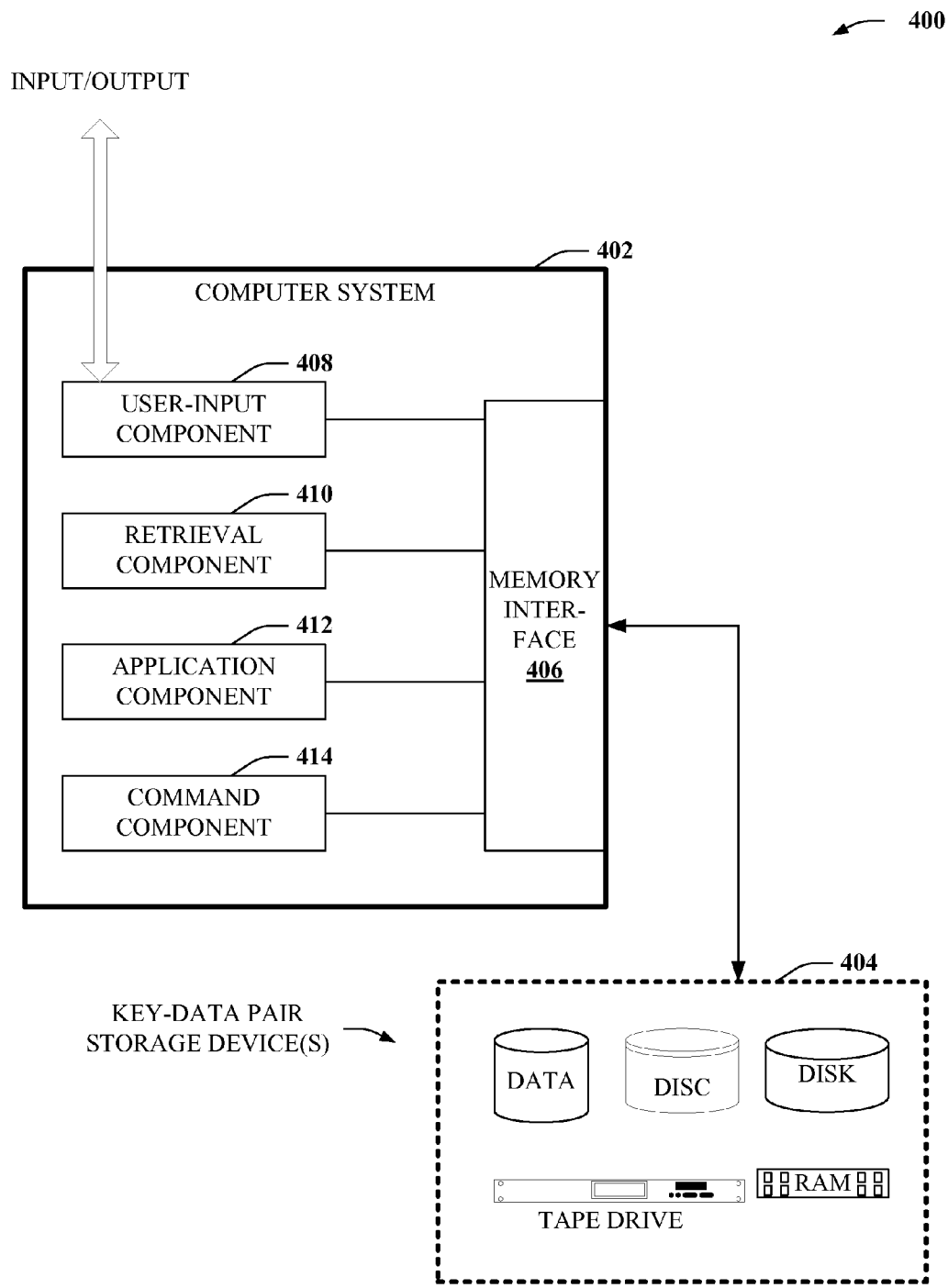
FIG. 4 depicts a block diagram of a sample system for generating high level data objects from block-level characterization of data according to further aspects.

System 300 further comprises a transport component 310 for interfacing with an external processing device (e.g., a computer—not depicted, but see FIG. 4, infra). The atomic record component 302 can output data, data records, key-data pair values of such records, or clustering patterns of such records (e.g., to characterize how data is stored in physical memory) via the transport component 310. Furthermore, the transport component 310 can convey operational commands, such as Write commands, Read commands, Make Durable commands, and so on, from the external processing device to atomic record component 302. Furthermore, the transport component 310 can convey modified data record values to or from the atomic record component 302, to facilitate manipulation of stored data, or to report results of commands, respectively.

Atomic record component 302 can further comprise various sub-components (312, 314, 316, 318) for implementing block-level maintenance, space management and transactioning operations for physical memory 304. Specifically, an aggregation component 312 can cluster data within physical memory 304 based on variable key values associated with data records 306. For instance, similar key values, representing associated data, can be stored in adjacent subsets of physical memory 304 to facilitate improved latency for operations on such associated data. Furthermore, a degree of proximity within portions of physical memory 304 can depend on a degree of similarity of such key values. In at least one aspect of the subject disclosure, the degree of similarity can be based on a binary comparison of key values; a greater comparison providing a greater inference of similarity. In general, aggregation component 312 can facilitate various space management operations for atomic record component 302, by clustering data, un-clustering data, or manipulating existing data clusters.

In addition to the foregoing, atomic record component 302 can comprise a compression component 314 for efficiently storing data in physical memory 304 or for efficiently storing data records 306 in operational storage 308. In at least one aspect, the compression component can employ prefix compression on key-data pair values of adjacent data records 306. Such compression can lead to more efficient storage of data records 306. Furthermore, compression component 306 can employ various algorithms for compressing data stored in physical memory 304. For instance, where suitable, hash functions can be employed in reducing total stored data while mitigating data loss as a result of compression.

In at least some aspects of the subject disclosure, atomic record component 302 can comprise a data protection component 316. Data protection component 316 can employ suitable algorithms (e.g., secret key encoding, private-public key pair encoding, and so on) for encrypting or decrypting data stored in physical memory 304. A range of variable length data records received from an external host (not depicted) via the transport component 310 can be processed by the data protection component 316. Specifically, one or more encryption algorithms employed by the data protection component 316 can be executed for a range of data records, marked for encryption, by the external host. Accordingly, system 300 can encrypt data in response to a command (obtained via transport component 310) by a host device, for instance, and the encrypted data can be output to the host device by atomic record component 302. Thus, data encryption to mitigate unauthorized use of such data can be implemented for individual records or a set of specified records by system 300. According to other aspects, encrypted data can be decrypted prior to such output as well. In at least one aspect, data protection component 316 can implement a secure communication connection via the transport component 310, employing data tunneling protocols or the like.

In addition to the foregoing, atomic record component 302 can comprise an operations component 318 for implementing various data management commands (e.g., received from a host device via transport component 310). At a basic level, operations component 318 can facilitate reading, writing, updating, making durable or deleting a specified set of data records maintained in physical memory 304, or similar operations on data record values stored in operational storage 308. Additionally, operations component 318 can implement transactioning algorithms for managing data stored in physical memory 304. For instance, error detection algorithms can be employed to identify data errors for data records in physical memory 304, as well as error correction algorithms for correcting such detected errors. In some aspects, operations component 318 can implement data de-fragmentation to improve efficiency of read, write and delete operations, minimizing overall latency of system 300.

By implementing various data management operations at a block-level of abstraction, system 300 provides a powerful data storage device (304) providing significant reduction in overhead processing for external processing systems. Furthermore, block-level security can be implemented to increase integrity of stored data, or reduce likelihood of unauthorized access to input or output of data. Such implementation can further reduce external overhead processing in many applications.

FIG. 4 illustrates a block diagram of an example system 400 for employing key-data pair storage abstractions in building higher level data objects. System 400 can comprise a computer system 402 operatively coupled with a storage device 404. The storage device 404 can comprise various types of storage media, including volatile and non-volatile storage media. Specifically, storage device 404 employs a flexible data record abstraction at the block-level, as described herein. Accordingly, space management, transactioning, security and other operations can be implemented by storage device 404 at a block-level, generally reducing overhead design considerations for computer system 402.

Computer system 402 can comprise a memory interface 406 for communicatively coupling with the data storage device. A retrieval component 410 can be employed to obtain data records characterizing data stored by the storage device 404. Specifically, the data records can be flexible entities, comprising key-data pair values for defining identity, location and size of subsets of the stored data. Records can be aggregated based on similarity of stored data, represented by suitable similarities in key values of corresponding data records.

Computer system 402 can comprise an application component 412 for generating abstracted data objects built on data stored in storage device 404. Based on the block-level abstraction provided by storage device 404, compilation and manipulation of the abstracted data objects can comprise definition of suitable key-data pair values, expressed in variable binary data fields. For instance, a file structure can be established by employing key value prefixes for various data files, where hierarchical associations can be represented by suitable similarities in prefix value. Likewise, a database or spreadsheet can be constructed based on similar organization of key value prefixes. Data can be output to a user interface device via a user-input component 408. Additionally, such component 408 can provide a mechanism for user control of data fields, including naming data fields, populating data fields, and the like.

A command component 414 can be employed by computer system 402 for passing data commands to the storage device 404. Such commands can include read, write, update, delete or make durable commands, or similar commands suitable for manipulation of data. Commands can include modified data records consistent with higher level data objects constructed by the application component 412. Data storage device 404 can receive such commands and dynamically restructure stored data to consistent with the modified data records. Accordingly, computer system 402 can save significant overhead in manipulating the physical storage of data at storage device 404.

Additionally, command component 414 can pass various space management or transactioning commands to be implemented by the data storage device. Such commands can include de-fragmentation, error detection/correction, data encryption, and so forth. Accordingly, computer system 402 can save significant overhead in implementing such commands, obviating specific coding based on an underlying knowledge of physical storage of the storage device 404 otherwise required for such operations.

FIG. 5 illustrates a block diagram 500 of example system or application level data abstractions 502 built on a flexible block-level data abstraction according to further aspects of the subject disclosure. As depicted, diagram 500 comprises three levels of abstraction, a block-level implemented by a data storage device 504, and first and second abstraction levels stored in disc storage 506 and an application database 510, respectively. It should be appreciated, however, that additional levels of abstraction can be included within the spirit and scope of the subject disclosure and appended claims.

One example of the first level data abstraction can include a file system object (e.g., a hierarchical file structure). The second level of abstraction 512 can be, for instance, a transactional database or spreadsheet object. The higher level data abstractions 508, 512 can be built from data records representing data stored by the data storage device 504. The data records can be passed directly or indirectly between applications implementing these higher level data objects and the underlying storage device 504. Thus, each structure 508, 512 can be built directly on the block-level of abstraction. Alternatively, one structure (512) can be built on top of the other (508), which is in turn is built upon the block-level of abstraction. In at least one aspect, data records can be shared among the higher level data objects to implement mutual data manipulation, in effect incorporating different levels of abstraction at each level. Such a result can be achieved based on the flexibility of the data records. For instance, shared key value and data value pairing can be implemented for a subset of data records, to provide consistency between the higher level data objects 508, 512. Furthermore, other data records can be aggregated in different manners to provide partial diversity. Accordingly, a great degree of flexibility is provided by the block-level data abstraction, yielding a powerful basis for creating higher level data objects. Additionally, because space management, data transactioning and like operations can be implemented by the data storage device 504, significant complexity is avoided at the higher levels 508, 512. Thus, the data abstractions provided by FIG. 5 exhibit a new paradigm in manipulating data heretofore unavailable with conventional block-level abstractions of stored data.

The aforementioned systems have been described with respect to interaction between several components. It should be appreciated that such systems and components can include those components or sub-components specified therein, some of the specified components or sub-components, and/or additional components. For example, a system could include data storage device 100, physical storage 102, atomic record component 106, and computer system 402, or a different combination of these or other components. Sub-components could also be implemented as components communicatively coupled to other components rather than included within parent components. Additionally, it should be noted that one or more components could be combined into a single component providing aggregate functionality. For instance, retrieval component 410 can include command component 414, or vice versa, to facilitate obtaining data records and passing commands based on such records to a data storage device by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 6:
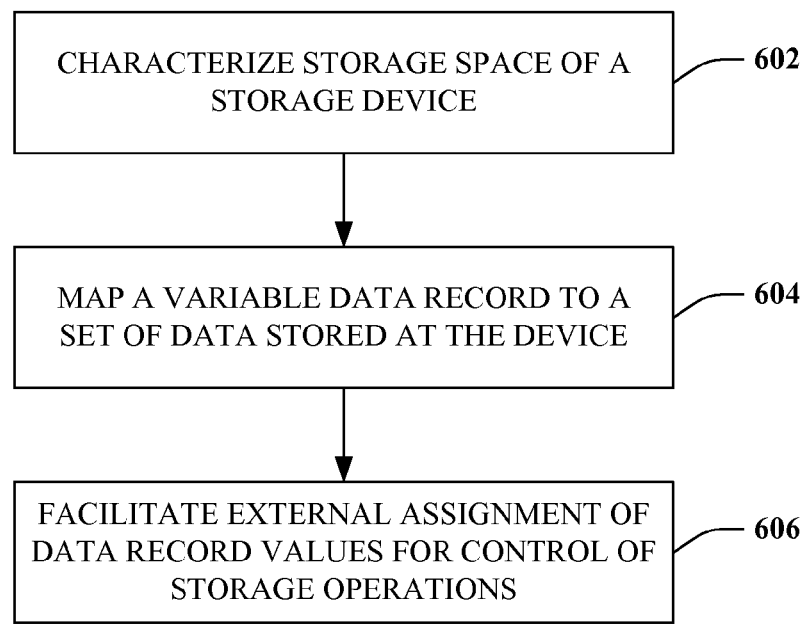
FIG. 6 depicts a flowchart of a sample methodology providing block-level data abstraction from variable size data records according to one or more aspects.
Figure 7:
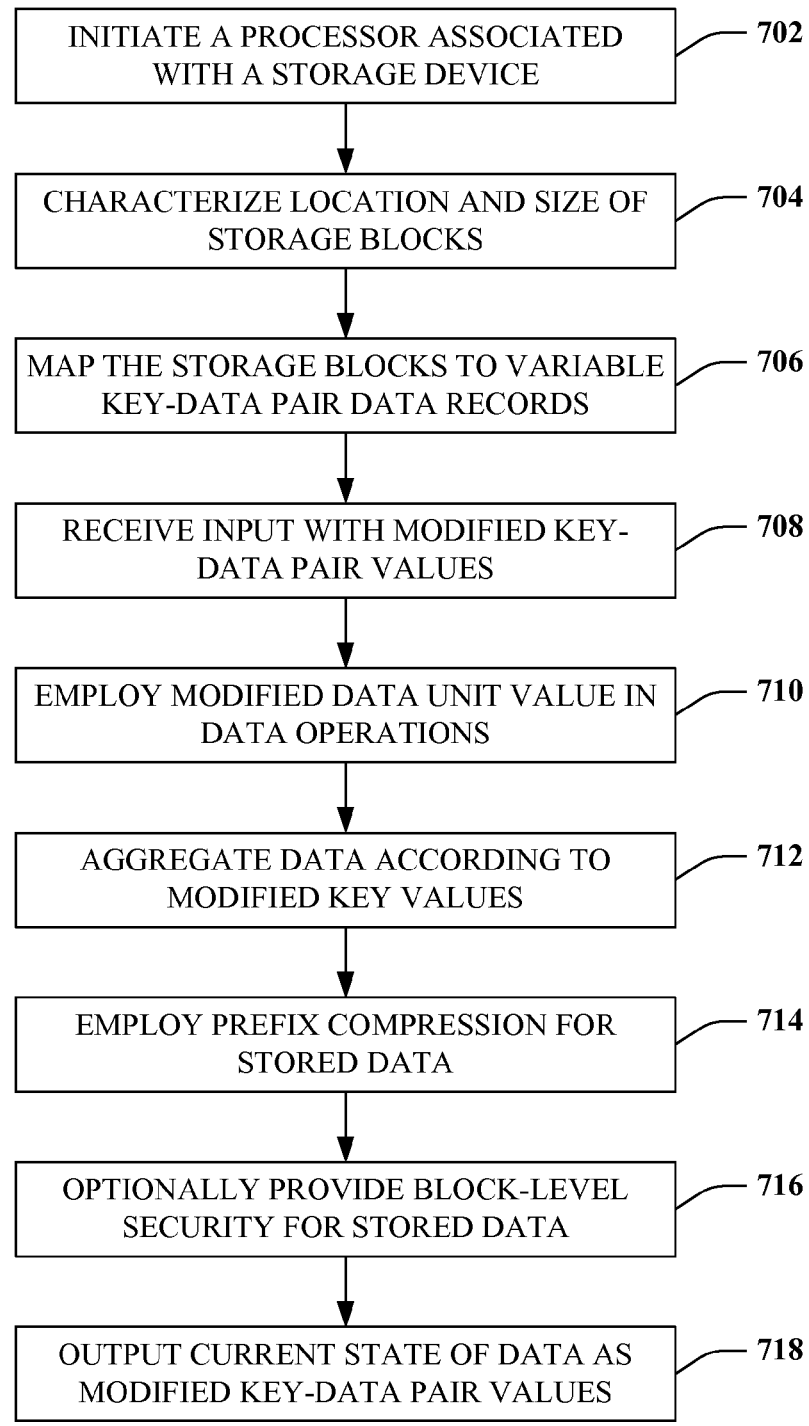
FIG. 7 illustrates a flowchart of an example methodology for implementing block-level data transactioning according to still other aspects.
Figure 8:
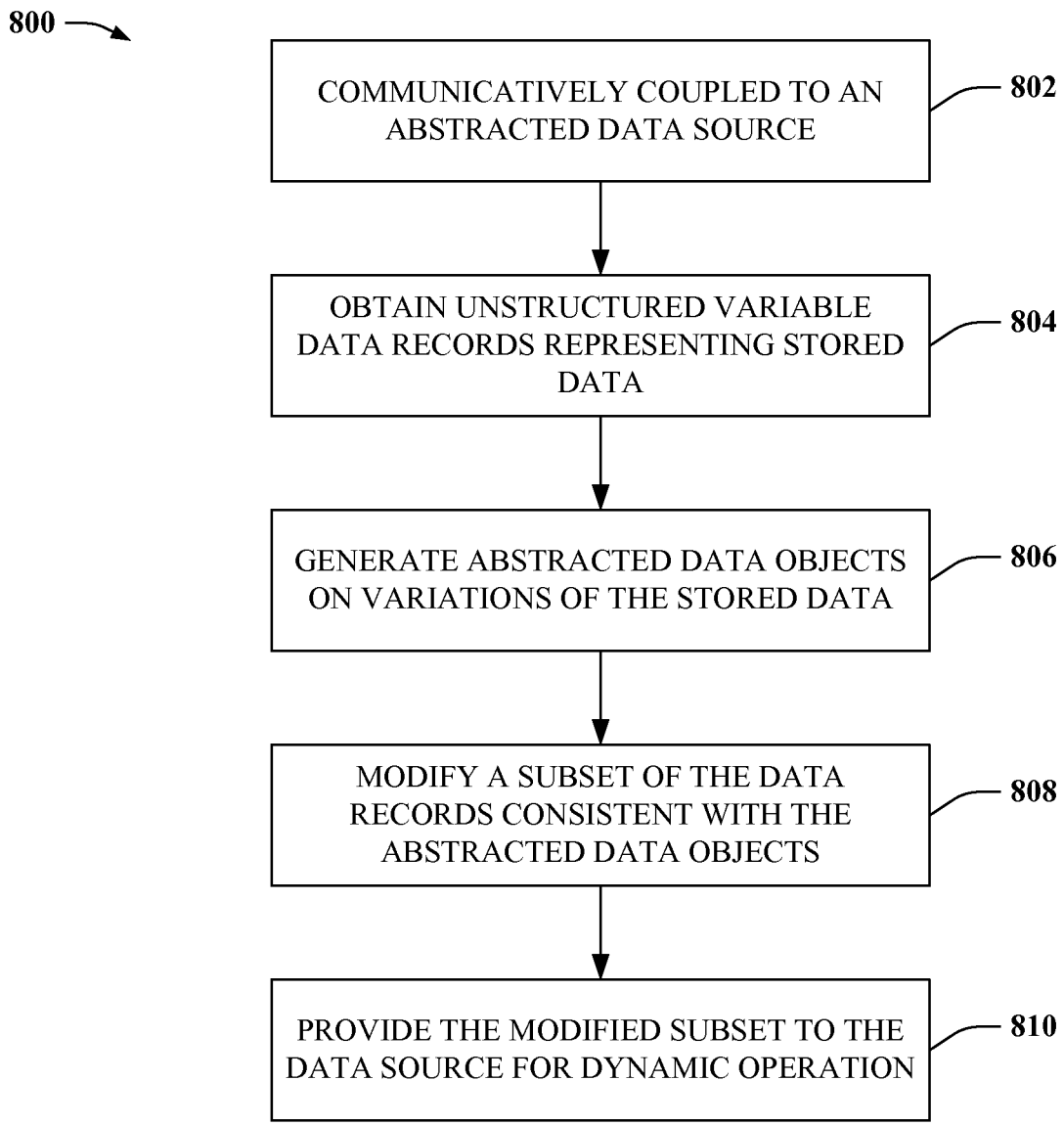
FIG. 8 depicts a flowchart of an example methodology for building high level data objects from block-level variable data records according to still other aspects.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or media.

FIG. 6 illustrates a block diagram of an example methodology 600 for providing data storage based on a flexible abstraction of data according to aspects of the subject disclosure. At 602, method 600 can characterize physical storage space of a storage device. Such a device can comprise volatile memory, such as RAM, DRAM, cache, or the like, or non-volatile memory, including a CD drive, DVD drive, FLASH drive, hard drive, magnetic tape drive, or the like. Furthermore, the physical storage space can comprise a single medium, such as a CD, DVD or magnetic tape, or multiple blocks of media, such as multiple chips of volatile or non-volatile memory. Additionally, the characterization of the physical storage space can include segmenting the space into sets of variable size portions of data, including locations of such data on the storage medium or media and distinguishing flags for the various portions.

At 604, method 600 can map a variable data record to a set of data stored in the physical storage space. Mapping can comprise generating default values for a variable binary key-data pair associated with the data record. Additionally, the variable binary key-data pair can comprise an adjustable binary key field and an adjustable binary data field. Furthermore, a value of the key field can identify the set of data mapped to the variable data record, and location(s) of such set within the physical storage space. Furthermore, a value of the data field can represent an amount of data mapped to the data record, as well as an amount of free storage space represented by the data record.

At 606, method 600 can facilitate external assignment of data record values for external control of storage operations of the data storage device. Data stored in the storage device can be dynamically restructured based on changes to the data record values. Accordingly, space management is provided by method 600 at a block-level of abstraction, rather than at higher levels of abstraction, significantly reducing overhead processing for external processing devices.

FIG. 7 illustrates a flowchart of an example methodology for implementing block-level space management according to flexible abstractions of block-level data. At 702, method 700 can initiate a processor associated with a data storage device. At 704, method 700 can employ the processor in characterizing location and size of subsets of physical media of the data storage device. Furthermore, at 706, method 700 can employ the processor in mapping the storage blocks to variable key-data pair data records. At 708, method 700 can receive input with modified key-data pair values for a data record. At 710, method 700 can employ modified data unit values in implementing data operations associated with the data record. For instance, commands provided with such data values can be implemented on data associated with the data record, in accordance with the modified key-data pair values. At 712, method 700 can aggregate data on the data storage device in accordance with the modified data values. At 714, method 700 can employ prefix compression for stored data records, based on similar prefix values of adjacent data records. At 716, method 700 can optionally provide block-level security in conjunction with the data operations. At 718, method 700 can output current state information of modified data as data records comprising modified key-data pair values. As described, method 700 provides for manipulation of stored data through basic commands and manipulation of data record values representing such data. Such an implementation can allow for flexibility in building complex data objects on top of raw data storage, for various types of storage media, as described herein.

FIG. 8 illustrates a flowchart of an example methodology 800 for building high level data objects from block-level variable data records according to still other aspects of the subject disclosure. At 802, method 800 can communicatively couple to a data storage device comprising a flexible record-based abstraction of data. At 804, method 800 can obtain unstructured variable data records representing data stored on the storage device. At 806, method 800 can generate abstracted data objects based on structured association of storage device storage space and stored data. At 808, method 800 can modify a subset of the data records consistent with the structured association for the abstracted data objects. At 810, method 800 can provide the modified subset of the data source to the storage device for dynamic restructuring of data within the storage space, based on the modified data records.

Figure 9:
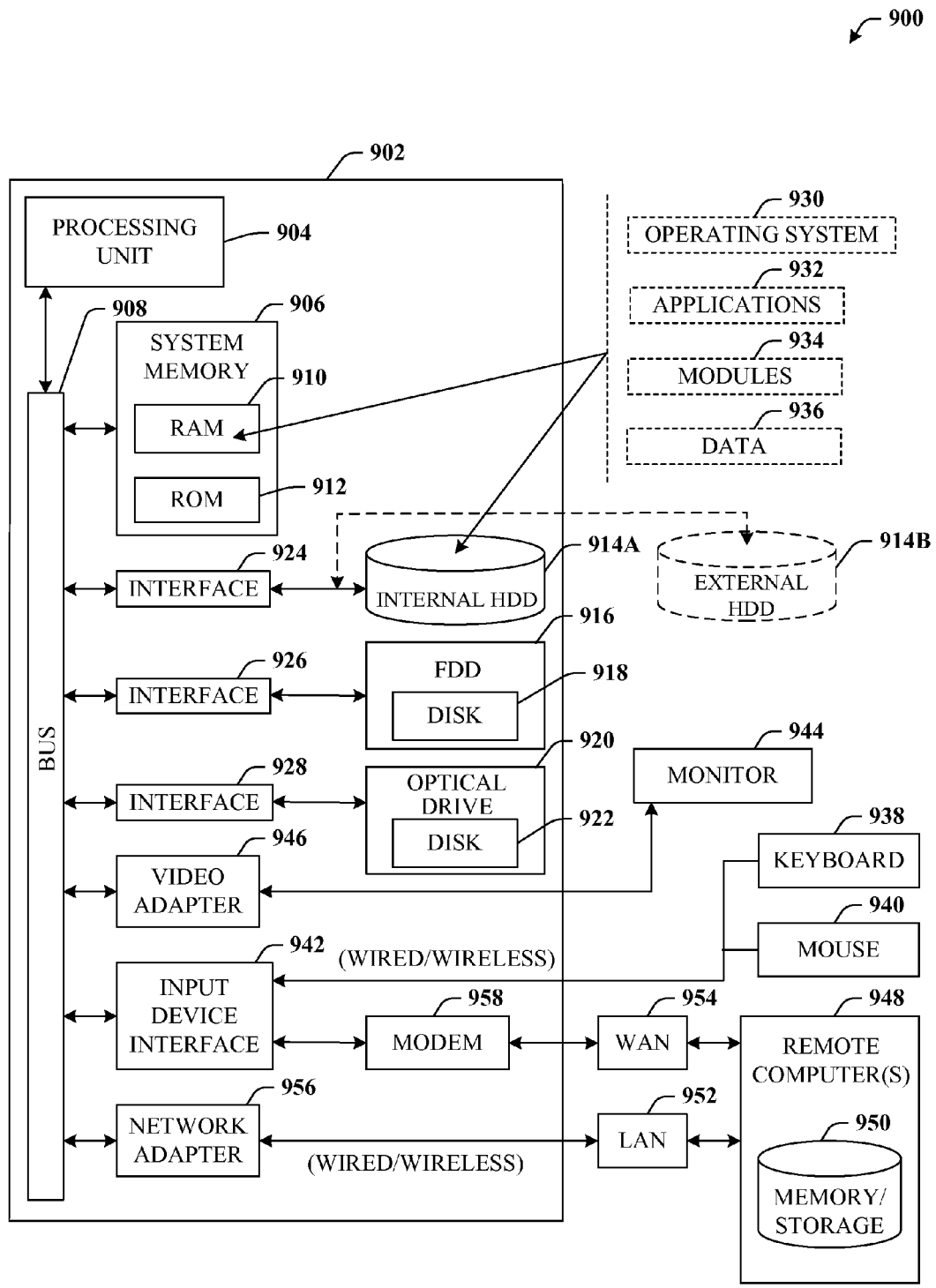
FIG. 9 illustrates a block diagram of an example operating environment for electronic processing and data manipulation according to some disclosed aspects.

Referring now to FIG. 9, there is illustrated a block diagram of an exemplary computer system operable to compile and graphically rendering user context or sentiment information according to aspects of the disclosure, as well as execute other aspects of the disclosed architecture. In order to provide additional context for various aspects of the claimed subject matter, FIG. 9 and the following discussion are intended to provide a brief, general description of a suitable computing environment 900 in which the various aspects of the claimed subject matter can be implemented. Additionally, while the claimed subject matter described above can be suitable for application in the general context of computer-executable instructions that can run on one or more computers, the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer, and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, FLASH memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 9, the exemplary environment 900 for implementing various aspects of the claimed subject matter includes a computer 902, the computer 902 including a processing unit 904, a system memory 906 and a system bus 908. The system bus 908 couples system components including, but not limited to, the system memory 906 and the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914A (e.g., EIDE, SATA), which internal hard disk drive 914A can also be configured for external use (1014B) in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, FLASH memory cards, cartridges, and the like, can also be used in the exemplary operating environment, and further, that any such media can contain computer-executable instructions for performing the methods of the claimed subject matter.

A number of program modules can be stored in the drives and RAM 910, including an operating system 930, one or more application programs 932, other program modules 934 and program data 936. All or portions of the operating system, applications, modules, and/or data can also be cached in the RAM 910. It is appreciated that the claimed subject matter can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 902 can include a modem 958, can be connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, within wireless communication range of a base station. WiFi networks use radio technologies called IEEE802.11(a, b, g, n, etc.) to provide secure, reliable, fast wireless connectivity. A WiFi network can be used to connect computers to each other, to the Internet, and to wired networks (which use IEEE802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 9BaseT wired Ethernet networks used in many offices.

Figure 10:
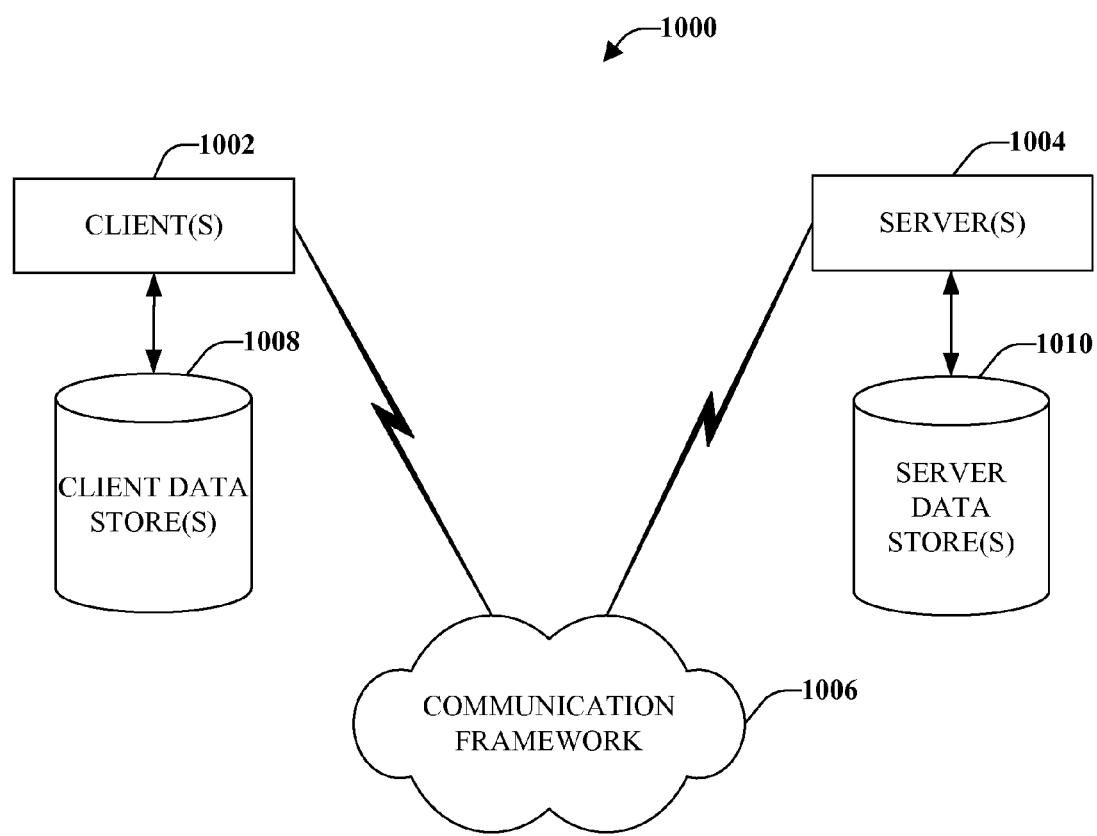
FIG. 10 depicts a block diagram of an example networking environment for remote communication to facilitate still other aspects of the subject disclosure.

Referring now to FIG. 10, there is illustrated a schematic block diagram of an exemplary computer compilation system operable to execute the disclosed architecture. The system 1000 includes one or more client(s) 1002. The client(s) 1002 can be hardware and/or software (e.g., threads, processes, computing devices). The client(s) 1002 can house cookie(s) and/or associated contextual information by employing the claimed subject matter, for example.

The system 1000 also includes one or more server(s) 1004. The server(s) 1004 can also be hardware and/or software (e.g., threads, processes, computing devices). The servers 1004 can house threads to perform transformations by employing the claimed subject matter, for example. One possible communication between a client 1002 and a server 1004 can be in the form of a data packet adapted to be transmitted between two or more computer processes. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the embodiments, but one of ordinary skill in the art can recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various methods.

In addition, while a particular feature may have been disclosed with respect to only one of several implementations, such feature can be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A data storage apparatus comprising:
   a plurality of physical data blocks, wherein ones of the plurality of physical data blocks have one or more fixed lengths;
   a processing circuit on the data storage apparatus and coupled to the plurality of physical data blocks, the processing circuit configured to map subsets of the plurality of physical data blocks to corresponding variable-length data records, the variable-length data records including corresponding key-value pairs, the variable-length data records representing information stored on the subsets; and
   an aggregation component configured to cluster the information stored on the subsets of the plurality of data blocks based on the corresponding key-value pairs.

2. The data storage apparatus of claim 1, wherein the aggregation component is further configured to re-allocate at least some of the stored information to different ones of the plurality of physical data blocks based at least on changes to ones of the corresponding key-value pairs of the variable-length data records.

3. The data storage apparatus of claim 1, further comprising a transport component configured to report clustering patterns of the variable-length data records.

4. The data storage apparatus of claim 1, further comprising an operations component configured to defragment the information represented by the variable-length data records.

5. The data storage apparatus of claim 1, further comprising an operations component configured to perform error correction on ones of the variable-length data records.

6. The data storage apparatus of claim 1, further comprising an operations component configured to perform error detection on ones of the variable-length data records.

7. The data storage apparatus of claim 1, further comprising a protection component configured to encrypt one or more of the variable data length records marked by an external host for protection.

8. The data storage apparatus of claim 1, further comprising:
   a transport component configured to interface with an external processing device and to convey operational commands from the external processing device to the aggregation component; and
   a protection component configured to establish a secure tunnel connection to the external processing device.

9. A data storage device comprising:
   a processing circuit on the data storage device coupled to a plurality of physical data blocks, ones of the plurality of physical data blocks having one or more fixed sizes, the processing circuit configured to determine a mapping of subsets of the plurality of physical data blocks corresponding to variable-sized data records, the variable-sized data records including corresponding key-value pairs, the variable-sized data records representing information stored on the subsets; and
   an atomic record component configured to:
     dynamically update the mapping based at least on changes to the corresponding key-value pairs of the variable-sized data records; and
     re-allocate, based on changes to at least some of the corresponding key-value pairs, at least some of the information to different ones of the subsets of the plurality of fixed-sized physical data blocks.

10. The data storage device of claim 9, wherein the atomic record component is further configured to re-allocate at least some of the information to different ones of the subsets of the plurality of fixed-size physical data blocks based at least on a change in a key portion of one of the key-value pairs.

11. The data storage device of claim 9, wherein the atomic record component is further configured to re-allocate at least some of the information to different ones of the subsets of the plurality of fixed-size physical data blocks based at least on a change in a value portion of one of the key-value pairs.

12. The data storage device of claim 9, wherein the determining the mapping includes clustering ones of the variable-sized data records based on value portions of the key-value pairs.

13. The data storage device of claim 12, wherein the atomic record component is further configured to re-allocate the at least some of the information to different ones of the subsets of the plurality of fixed-size physical data blocks based at least on a change in a value portion of one of the key-value pairs.

14. A method comprising:
   at a block layer of abstraction, mapping subsets of a plurality of physical data blocks of a storage device to corresponding variable-length data records, the variable-length data records including corresponding key-value pairs, the variable-length data records representing information stored on the subsets, the physical data blocks having one or more fixed lengths;
   clustering the information stored on the subsets of the plurality of physical data blocks based on corresponding key-value pairs at the block layer of abstraction; and
   at the block layer of abstraction, re-allocating at least some of the variable-length data records to different ones of the subsets of the plurality of physical data blocks based on changes in the corresponding key-value pairs of the variable-length data records.

15. The method of claim 14, further comprising reporting, to an external host, clustering patterns of the variable-length data records.

16. The method of claim 14, further comprising at the block layer of abstraction, defragmenting the information stored on the subsets of the plurality of physical data blocks.

17. The method of claim 14, wherein the re-allocating at least some of the variable-length data records to different ones of the subsets of the plurality of physical data blocks is based at least on changes in a key portion of at least one of the key-value pairs.

18. The method of claim 14, wherein the mapping and clustering are based at least on key portions of the key-value pairs.

19. The method of claim 14, wherein the re-allocating at least some of the variable-length data records to different ones of the plurality of physical data blocks is based at least on changes in a value portion of at least one of the key-value pairs.

20. The method of claim 14, wherein the mapping and clustering are based at least on value portions of the key-value pairs.

\* \* \* \* \*